July 1, 1924.
E. G. HODGES
Re. 15,869
CARBURETOR
Original Filed July 3, 1918
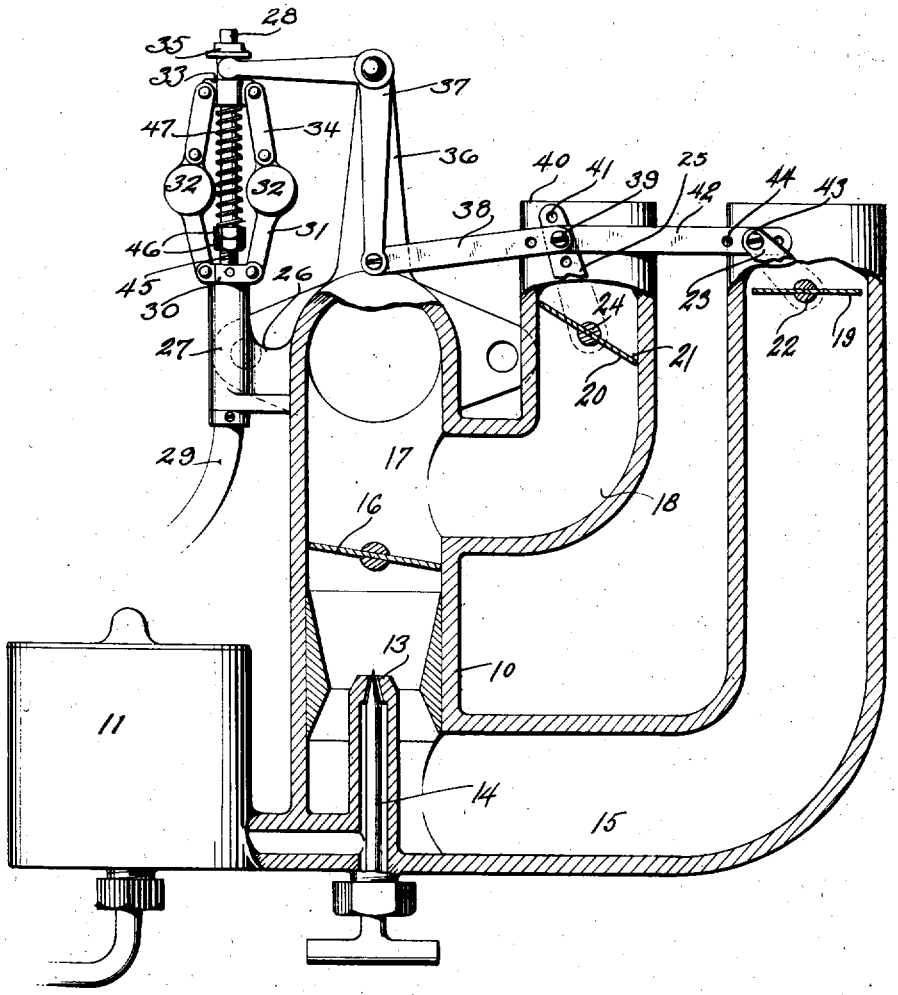
INVENTOR.
Edward G. Hodges
BY
Ira M. Jones.
ATTORNEY.

Reissued July 1, 1924. Re. 15,869

UNITED STATES PATENT OFFICE.

EDWARD G. HODGES, OF MILWAUKEE, WISCONSIN.

CARBURETOR.

Original No. 1,330,024, dated February 3, 1920, Serial No. 243,192, filed July 3, 1918. Application for reissue filed October 12, 1921. Serial No. 507,362.

*To all whom it may concern:*

Be it known that I, EDWARD G. HODGES, a citizen of the United States, residing at Milwaukee, in the county of Milwaukee and State of Wisconsin, have invented new and useful Improvements in Carburetors, of which the following is a specification.

This invention relates to certain new and useful improvements in carburetors for internal combustion engines, and has for one of its objects to provide a carburetor of the type in which the fuel content of the combustible mixture increases as the load on the engine increases and decreases as the load on the engine decreases, the engine being supplied as near as possible a constant volume of air and the quantity of fuel mixed with the air being varied in coordination with the load on the engine.

The usual practice in governing or controlling an engine operated at varying speeds and loads is to supply the engine as near as possible with a constant proportion of fuel in relation to air, the volume of which is varied according to the engine load. In some cases, it is sought to supply the engine a greater proportion of fuel in relation to air when the engine load condition is lighter than that supplied when the engine is operating under a heavy load condition.

This situation is true in practically all carburetors now in general use on engines that necessarily operate at all variations in speed and load conditions as a very small volume of air and a comparatively rich proportion of fuel constitute the combustible mixture for the light and no-load conditions. In automotive vehicles, the no-load condition exists during a large portion of the time as when the engine is operating at high speed with the throttle valve closed, as in the case when the vehicle is drifting. Under this condition each engine charge is highly impregnated with fuel and poor combustion results due to the fuel and air being poorly atomized and on account of the very small charge and consequent low compression.

Consequently, under no-load condition, considerable damage results, there is a complete loss of all the fuel used, formation of considerable carbon deposits which creates excess heat that must be cooled and furthermore a portion of the unburnt fuel often times enters the crank case past the piston rings and thus renders the lubricating oil less efficient.

The present invention overcomes all of the objectionable features of the carbureting device above described in that the engine is at all times supplied with as near as possible a constant volume of air for each engine charge and the relative proportion of fuel to air is varied according to the engine load. In so doing it is found that much more power is obtained from the same amount of fuel used. It is also found that the engine will turn over more freely while in the no-load condition. By allowing a volume of air to enter the cylinders there is a constant compression in engine which eliminates a back pressure which must exist when the compression condition in the engine is changed to a vacuum condition. It will be plainly understood that by allowing a compression in engine during the no-load condition the engine and its load will operate on the stored up energy for a much longer period than would be the case if the engine compression was changed to a vacuum condition.

It is another object of this invention to provide a carbureting device whereby a maximum rich mixture is supplied the engine while under the maximum load condition and in which the proportion of fuel to air is decreased as the engine condition approaches what may be termed the no-load condition in which the vehicle is drifting or moving under its own momentum. When the engine is operating under the no-load condition it is then highly desirable that a substantial volume of air only enter the engine cylinders in order that no combustion will take place and that the air entering the cylinder serve primarily as a cooling device. With this invention this desired condition is obtained, thus producing a carburetor which will assure the smooth operation of an internal combustion engine under all load conditions.

A more specific object of this invention is to provide a carburetor having a mixing chamber provided with a throttle valve and fuel supply means and air supply means communicating with the mixing chamber, the air supply means consisting of a plurality of conduits communicating with the mixing chamber on opposite sides of the throttle valve.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

The figure shows a side elevation partly in vertical section of a carburetor embodying my invention, and equipped with air valves and with controlling mechanism therefor, including a governor device adapted to be operatively connected with a moving part of an engine.

My improved carburetor is intended for motor vehicle engines or any explosive engine that has a throttle adapted to be operated for a variation in load and speed. I will describe it as used with an ordinary vehicle engine.

In the accompanying drawing, I have used the reference numeral 10 to indicate generally a hollow shell, the upper portion of which forms a mixing chamber of the carburetor.

Adjacent to the carburetor shell 10 is an ordinary float chamber 11 to which fuel is supplied by means of the tube 12. In the carburetor casing 10 is an ordinary fuel nozzle 13, and an ordinary needle valve 14 is provided for regulating the discharge of fuel from the nozzle 13. It will be understood, of course, that the nozzle 13 communicates with the float chamber or fuel supply.

The interior of the carburetor casing 10 adjacent to the discharge end of the nozzle 13 preferably has the Venturi tube shape.

Communicating with the lower portion of the carburetor casing 10 is an ordinary air passage or tube 15. Spaced above the discharge nozzle 13 is a throttle valve 16 which may be operated from the dash or otherwise in any suitable way.

Above the throttle valve 16 is a fuel mixture passage 17 for conducting the fuel mixture to the intake manifold to the engine cylinders.

Communicating with the fuel mixture passage 17 is an auxiliary air tube or passage 18.

In the tube 15 is substantially mounted a butterfly valve 19 forming a choke valve.

When the valve 19 is in its ordinary closed or normal position it is extended directly across the tube 15. In the tube 18 is another butterfly valve 20 adapted to coact with a seat 21 and so arranged that when seated it is extended diagonally across the interior of the tube 18.

On the stem 22 of the valve 19 is an arm 23, and on the stem 24 of the valve 20 is an arm 25.

Preferably formed integral with the upper portion of the fuel mixture passage 17 is a bracket 26 on which is formed a bearing 27 for an upright governor shaft 28. The upright shaft 28 is designed to be connected by a flexible shaft 29 with a substantially moving part of the engine on which the carburetor is used.

Above the bearing 27 there is fixed to the shaft 28 a collar 30 to which are pivoted opposite upwardly extending arms 31 which are secured to the balls 32 of the governor device.

Spaced above the balls 32 is a collar slidably mounted on the shaft 28 and connected with the balls 32 by links 34.

On the collar 33 is formed a grooved hub or the like 35. On the fuel supply passage 17 is another bracket or arm 36 on which is centrally pivoted a bell crank lever 37. One end of the bell crank lever 37 extends into the groove of the hub 35, as illustrated in the drawing.

Pivoted to the other end of the bell crank lever 36 is a link 38 which extends toward and is pivoted to the arm 25 of the valve stem 24 by means of a pin or the like 39.

The link 38 has a series of openings 40 for selectively receiving the pin 39.

The arm 25 also has a series of openings for receiving said pin 39. By selectively mounting the pin 39 in different openings 40 and 41 the relative movement of the arm 25 and the valve 20 with relation to the governor may be adjusted and regulated.

Pivotally mounted in the pin 39 is a link 42 which is also pivotally connected with the arm 25 by means of a pin 43 selectively mounted in one of a plurality of holes 44 in the link 42. It will be seen that by selectively mounting the pin 43 in different holes 44 and by the adjustment of the pin 39 above referred to, the relative movement of the valve 19 with relation to the governor device may be regulated and the relative movement of the valves 20 and 19 with relation to each other may be regulated as desired.

A portion of the shaft 28 just above the collar 30 is screw-threaded at 45 and on said screw-threaded portions are lock nuts 46. Between the upper nut 46 and the collar 33 is a spring 47 which normally tends to hold the collar 33 in its raised position for thereby holding the bell crank lever 37 in such position as to close the valves 20 and 19.

In the practical operation of my improved carburetor the carburetor is installed on the engine in the ordinary way and the tube 12 is connected with a suitable source of fuel supply.

The flexible shaft 29 is operatively connected with some moving part of the engine. The fuel mixture passage 17 is connected with the intake manifold, and the device is then ready for use.

In such practical use of my improved carburetor, the parts are originally so set that the valves 19 and 20 will normally be held in their closed position as illustrated in the drawing.

The position of the valves just described is that which they should assume when the engine is being started or is run at low speed.

As the speed of the engine increases the balls 32 will tend to be thrown outwardly by centrifugal force and draw the collar 43 downwardly, thereby controlling the bell crank lever 37 for moving the links 38 and 42 for opening the valves 20 and 19.

It will be noted that the arm 23 is shorter than the arm 25, so that the opening movement of the valve 19 is more rapid than the opening movement of the valve 20.

It may be mentioned in this connection that the valve 19 is of such size as to allow the passage of a certain amount of air even when the valve 19 is in its closed position, shown in the drawings, so that sufficient air is admitted to the carburetor for starting and running at very slow speed.

In the description and drawing I have illustrated an ordinary centrifugal or ball governor, however, it will be readily appreciated that any means may be employed that will operate the air valves according to the speed of the engine.

With the valves 19 and 20 in closed position, an opening of the throttle valve to increase the engine speed creates a high vacuum at the fuel nozzle, as a result of which the desired volume of fuel is supplied the engine for the extra load placed thereon. By reason of the opening surrounding valve 19, sufficient air is supplied the combustible mixture upon the opening of the throttle valve.

As the engine speed increases, valves 19 and 20 open proportionately to increase the volume of air supplied the combustible mixture. With the engine operating under the light load condition, a closing of the throttle valve will lessen the fuel content of the combustible mixture to insure the efficient operation of the engine.

When the engine is operated under no-load condition, as in the case of a vehicle when drifting and turning the engine over, air only is supplied the engine when the throttle valve is closed, as the valves 19 and 20 will be retained in open position proportionately to the speed of the engine, the air entering the engine cylinders through conduit 18. With the engine operating under this no-load condition, an opening of the throttle valve will immediately supply fuel to the air in the proper proportion to supply the engine with the mixture necessary for strong combustion.

From the foregoing description taken in connection with the accompanying drawings it will be readily obvious to those skilled in the art to which an invention of this character appertains that the proportion of fuel to air is coordinated with the engine load, in that, with the throttle 16 at a predetermined setting, a decrease in the engine speed, due to an increase in the load or stress at the engine pistons, will result in the closing movement of the air valves 19 and 20 and the supplying to the engine of a richer combustible mixture.

What I claim as my invention is:

1. A carburetor for internal combustion engines, comprising a mixing chamber, two air conduits communicating with said chamber, operatively connected valves in said conduits, means for moving said valves toward open position as the engine speed increases and toward closed position as the engine speed decreases, a throttle valve, and fuel supply means in said chamber, said throttle valve and fuel supply means being positioned intermediate the points of communication of said conduits with the mixing chamber.

2. A carburetor for internal combustion engines, comprising a mixing chamber, air conduits communicating with said chamber, valves in said conduits, means for moving said valves toward open position as the engine speed increases and toward closed position as the engine speed decreases, a throttle valve, and fuel supply means in said chamber, said throttle valve and fuel supply means being positioned intermediate the points of communication of two of said conduits with the mixing chamber, whereby movement of the throttle valve toward open position will increase the proportion of fuel in relation to air and a movement toward closed position will decrease the proportion of fuel in relation to air.

3. A carburetor for internal combustion engines, comprising a mixing chamber, air conduits communicating with said chamber, valves in said conduits, means for moving said valves toward open position as the engine speed increases and toward closed position as the engine speed decreases, and a fuel supply means, said fuel supply means discharging into the chamber intermediate the points of communication of two of said conduits with the mixing chamber, the parts being so constructed and arranged that upon an increase in the load on the engine the proportion of fuel in relation to air will be increased and upon a decrease in the load on the engine the proportion of fuel in relation to air will be decreased.

4. A carburetor for internal combustion engines, comprising a mixing chamber, a throttle valve therein, means for supplying fuel to said chamber, a plurality of conduits for supplying air to the mixing chamber, one of said conduits communicating with said chamber between the throttle valve and the discharge end of said chamber, a control valve in each of said conduits, and automatically operable means for actuating said conduit control valves to vary the volume of air passing therethrough, said conduit control valves being normally held in a substantially closed position by said automatically operable means while the engine is operating at minimum speed and moved toward open position by said automatically operable means as the speed of the engine increases.

5. A carburetor for internal combustion engines, comprising a mixing chamber, a throttle valve therein, means for supplying fuel to said chamber, a plurality of conduits for supplying air to the mixing chamber, the fuel from said supply means and the air from said conduits being commingled to form the engine combustible mixture, one of said conduits communicating with the mixing chamber between its discharge end and said throttle valve, and automatically actuated valves in said conduits for varying the volume of air passing therethrough, said automatically actuated valves being normally held in substantially closed position while the engine is operating at minimum speed and automatically moved toward open position as the engine speed increases, whereby air only is supplied the engine when the same is operated by momentum with said throttle valve closed, a minimum proportion of fuel in relation to air constitutes the combustible mixture when a minimum load is applied to the engine and the proportion of fuel in relation to air is increased as the engine load increases until the desired maximum rich combustible mixture is produced when the engine obtains its maximum load condition.

6. A carburetor for internal combustion engines, comprising a mixing chamber, a throttle valve therein, means for supplying fuel to said chamber, a plurality of conduits for supplying air to the mixing chamber, one of said conduits communicating with said chamber between the throttle valve and the discharge end of said chamber, and automatically actuated valves in said conduits for varying the volume of air passing therethrough, said automatically actuated valves being normally held in a substantially closed position while the engine is operating at minimum speed and automatically moved toward open position as the speed of the engine increases whereby when the engine is operating at any speed above its slowest speed and the speed is decreased due to an increase in load on engine the relative proportion of fuel to air supplied the engine will be increased.

7. A carburetor for internal combustion engines, comprising a mixing chamber, a throttle valve therein, means for supplying fuel to said chamber, a plurality of conduits for supplying air to the chamber, one of said conduits communicating with said chamber between its discharge end and said throttle valve, and automatically actuated valves in said conduits for varying the volume of air passing therethrough, said automatically actuated valves being normally held in a substantially closed position while the engine is operating at minimum speed and automatically moved toward open position as the speed of the engine increases whereby when the engine is operating at any speed below its highest speed and the speed is increased due to a decrease in load on engine the relative proportion of fuel to air supplied the engine will be decreased.

8. In a device of the class described, a carburetor chamber, a plurality of air conduits communicating therewith, automatically actuated valves in said conduits for varying the area of said conduits at some point therein, said valves being moved toward open position as the speed of the engine increases and toward closed position as the speed of the engine decreases, a throttle valve, and a fuel supply means, said throttle valve and fuel supply means being positioned intermediate the points of communication of said conduits with said chamber, whereby a substantial volume of lean combustible mixture is supplied for each engine charge when the throttle valve is in nearly closed position and the fuel content of the combustible mixture is relatively increased as the throttle valve is moved toward open position to increase the load on the engine.

9. A carburetor for internal combustion engines, comprising a mixing chamber, a throttle valve for controlling the passage of fluids from said chamber, an air passage communicating with said chamber outwardly of said throttle valve, an air passage communicating with said chamber inwardly of said throttle valve, fuel supply means communicating with said chamber between the last mentioned air passage and said throttle valve, automatically actuated valves in said air passages for varying the area thereof, and means for operatively connecting said air passage valves, said air passage valves being normally yieldably held in a substantially closed position when the engine is inoperative and moved toward open position as the speed of the engine increases from minimum to maximum speed.

In testimony whereof I affix my signature.

EDWARD G. HODGES.